United States Patent
Bach et al.

(10) Patent No.: US 8,851,485 B2
(45) Date of Patent: Oct. 7, 2014

(54) APPARATUS AND METHODS FOR INCREASING THE BUOYANCY OF A WHEELED VEHICLE

(71) Applicants: David E. Bach, Boulder, CO (US);
Francis M. Bach, Boulder, CO (US);
Nicholas G. Conda, Boulder, CO (US);
Tracy L. Hoose, Montrose, CO (US)

(72) Inventors: David E. Bach, Boulder, CO (US);
Francis M. Bach, Boulder, CO (US);
Nicholas G. Conda, Boulder, CO (US);
Tracy L. Hoose, Montrose, CO (US)

(*) Notice: Subject to any disclaimer, the term of this patent is extended or adjusted under 35 U.S.C. 154(b) by 0 days.

(21) Appl. No.: 13/799,444

(22) Filed: Mar. 13, 2013

(65) Prior Publication Data
US 2013/0313794 A1  Nov. 28, 2013

Related U.S. Application Data

(60) Provisional application No. 61/688,944, filed on May 25, 2012, provisional application No. 61/751,197, filed on Jan. 10, 2013.

(51) Int. Cl.
*B62B 19/02* (2006.01)
(52) U.S. Cl.
CPC .................................. *B62B 19/02* (2013.01)
USPC ................................ 280/13; 280/7.12; 280/8
(58) Field of Classification Search
USPC ............ 280/13, 12.1, 7.12, 7.14, 7.17, 8, 16, 280/21.1
See application file for complete search history.

(56) References Cited

U.S. PATENT DOCUMENTS

| | | | |
|---|---|---|---|
| 556,350 A | 3/1896 | Hokanson et al. | |
| 564,306 A | 7/1896 | Dean | |
| 650,171 A | 5/1900 | Dannehl | |
| 659,560 A | 10/1900 | Tietjen | |
| 773,959 A | 11/1904 | Meissner | |
| 1,745,643 A * | 2/1930 | Roessel | 280/7.12 |
| 3,473,818 A | 10/1969 | Meredith | |
| 3,561,777 A | 2/1971 | Geis | |
| 3,561,783 A * | 2/1971 | Ellett | 280/16 |
| 4,479,657 A * | 10/1984 | Reynolds | 280/8 |
| 5,102,153 A * | 4/1992 | Rhode | 280/7.14 |
| 5,291,972 A | 3/1994 | Griffith | |
| 6,554,294 B2 | 4/2003 | Laudon | |
| 6,626,441 B1 | 9/2003 | Hanson | |
| 8,403,342 B1 * | 3/2013 | McDaniel | 280/7.12 |
| 2002/0063402 A1 | 5/2002 | Scatchard | |
| 2002/0153677 A1 | 10/2002 | Laudon | |

OTHER PUBLICATIONS

International Search Report and Written Opinion, International Application No. PCT/US2013/030807, May 20, 2013, 7 pages.

* cited by examiner

*Primary Examiner* — Hau Phan
(74) *Attorney, Agent, or Firm* — Lathrop & Gage LLP

(57) ABSTRACT

An apparatus for increasing the buoyancy of a wheeled vehicle includes a ski to be disposed under at least one tire or wheel of a wheeled vehicle; a boot having a bottom wall secured directly or indirectly to the ski and side walls substantially perpendicular to the bottom wall, wherein the side walls of the boot are configured to laterally constrain the tire or wheel of the wheeled vehicle; and a tire block pin for connecting the side walls of the boot to one another to increase rigidity of the apparatus and to rotationally constrain the tire or wheel of the wheeled vehicle and/or tie downs for securing the wheel to the ski. Methods of using the apparatus are also disclosed.

19 Claims, 11 Drawing Sheets

APPARATUS AND METHODS FOR INCREASING THE BUOYANCY OF A WHEELED VEHICLE

CROSS-REFERENCE TO RELATED APPLICATIONS

This application claims the benefit of priority from U.S. Provisional Patent Application Nos. 61/688,944, filed May 25, 2012, and 61/751,197, filed Jan. 10, 2013, each of which is hereby incorporated by reference in its entirety.

BACKGROUND

Vehicles are generally designed to travel on one specific type of terrain, and few practical solutions for transforming a vehicle adapted to travel on one type of terrain for use on a second type of terrain are known. Further, existing systems for adapting vehicles often involve the removal and replacement of vehicle parts or extensive reconfiguration of the vehicle design.

By way of example, patent documents describing devices for improving the ability of a bicycle to travel on snow and ice include, for example, U.S. Pat. Pub. Nos. US 2002/0063402 and US 2002/0153677; and U.S. Pat. Nos. 556,350; 564,306; 650,171; 773,959; 3,561,777; and 6,626,441, each of which is hereby incorporated by reference to the extent not inconsistent herewith.

SUMMARY

The present apparatus and methods increase the buoyancy of a wheeled vehicle on porous, fluid or soft surfaces. The apparatus are generally accessories for wheeled vehicles that serve to broaden the terrain that vehicles can traverse and to reduce barriers associated with navigating varied landscapes. Apparatus described herein generally comprise a ski and tire binding system that allows an apparatus to be attached to and detached from one or more front and/or rear tires of a vehicle, and the apparatus may be adjustable to accommodate various tire widths. The apparatus are generally lightweight and adapted to stow and travel well. For example, in some embodiments, the apparatus may be stowed on a vehicle frame, e.g., in a configuration useable as a bike rack, or carried in or on a backpack. It is not necessary to modify the vehicle to utilize the apparatus. In particular, it is not necessary to remove a wheel of the vehicle in order to mount the apparatus.

In an embodiment, the apparatus and methods disclosed allow a cyclist to push or ride a bike easily and quickly through snow without getting bogged down, to ride cross-country through light or heavy snow, and to take downhill adventures on snowy slopes with better control and less effort than required to operate a bicycle without the present apparatus. Whether for a quick ride, touring, racing, exercising or downhill sporting, the present apparatus provides an avenue for navigation, maneuvers and fun.

In an aspect, an apparatus for increasing the buoyancy of a wheeled vehicle, includes a ski to be disposed under at least one tire or wheel of a wheeled vehicle and a pair of L-shaped boots. Each of the L-shaped boots has a bottom wall secured directly or indirectly to the ski and a side wall substantially perpendicular to the bottom wall. The side walls of the L-shaped boots are configured to laterally constrain the tire or wheel of the wheeled vehicle. Additionally, the apparatus includes at least one tire block pin for connecting the pair of L-shaped boots to one another to increase rigidity of the apparatus and to rotationally constrain the tire or wheel of the wheeled vehicle.

In an aspect, an apparatus for increasing the buoyancy of a wheeled vehicle, includes a ski to be disposed under at least one tire or wheel of a wheeled vehicle and a pair of L-shaped boots. Each of the L-shaped boots is formed with a bottom wall secured directly or indirectly to the ski and a side wall substantially perpendicular to the bottom wall. The side walls of the L-shaped boots are configured to laterally constrain the tire or wheel of the wheeled vehicle. The apparatus additionally includes a pair of tie downs disposed on the ski for securing the wheel and rotationally constraining the tire or wheel of the wheeled vehicle.

In an aspect, an apparatus for increasing the buoyancy of a wheeled vehicle includes a ski to be disposed under at least one tire or wheel of a wheeled vehicle and a boot having a unitary structure including a bottom wall secured directly or indirectly to the ski and two side walls substantially perpendicular to the bottom wall. The side walls are configured to laterally constrain the tire or wheel of the wheeled vehicle. Additionally, the apparatus includes at least one tire block pin for connecting the side walls to one another to increase rigidity of the apparatus and to rotationally constrain the tire or wheel of the wheeled vehicle.

Generally, a wheel having an apparatus mounted thereon does not rotate to drive the wheeled vehicle. For example, a wheel having the apparatus mounted thereon may be prevented from rotating by a device applying substantially constant brake pressure. Wheels may be locked when they have an apparatus mounted thereon. When an apparatus is attached to a front wheel, but not a rear wheel, the rear wheel need not be locked and the rear wheel can be used in its normal function, e.g., to propel the vehicle. The device for applying substantially constant brake pressure may, for example, be a brake lever band for continually activating a brake lever of the wheeled vehicle and/or a brake block for locking a wheel of the wheeled vehicle against a frame component of the wheeled vehicle. Alternatively, a wheel of the wheeled vehicle may be locked against a frame component of the wheeled vehicle by a strap wrapped, e.g. in a 'figure eight', around the top of a tire or wheel and the vehicle frame. In an embodiment, the strap may comprise a material selected from Velcro, rubber, webbing, nylon and combinations thereof. In another embodiment, a brake block may be disposed between the top surface of the tire, where it rotates through a tire fork and the vehicle frame.

In an embodiment, the side wall of the L-shaped boot may be hinged to the bottom wall of the L-shaped boot to facilitate substantially flat stowage of the boot or apparatus.

In an embodiment, the side walls of the L-shaped boot may have a curved top edge.

In an embodiment, the side walls of the L-shaped boot may be bowed slightly inward toward each other to better secure a tire of a wheeled vehicle.

Typically, the tire and the side wall of the L-shaped boot are in direct contact, and a distance between the side walls of the L-shaped boots is adjustable to accommodate tires of various sizes (e.g., widths). For example, the distance between the side walls of the L-shaped boots may be adjustable within a range selected from 1 inch to 18 inches, or selected from 1 inch to 12 inches, or selected from 1 inch to 6 inches.

In an embodiment, at least one tire block pin is disposed at a distal end of the pair of L-shaped boots.

In an embodiment, an apparatus further comprises one or more devices that protect against the possibility of losing the apparatus downslope in the snow, or unintentional separation of the ski from the wheel. A strap may, for example, be looped around each edge of the incised cut-out in an L-shaped boot and pulled over the tire as it sits in the boot, providing additional security that the wheel will not separate from the boot during use.

In an embodiment, two L-shaped boots can be manufactured as a unitary, one-piece unit, optionally including tire block pins. The unitary boot may be fabricated using a mold for carbon fiber, hard plastic injection molds, or other molded materials.

In an embodiment, two boots may be disposed on a single ski, with the boots spaced a distance from each other to accommodate a tire or wheel spacing of the vehicle. In this configuration, the wheels of the vehicle that are mounted to apparatus on a single ski cannot act independently of one another.

In an embodiment, the apparatus further comprises at least one mounting bracket for securing the bottom wall of the L-shaped boot to the ski. The mounting bracket may, for example, have a plurality of attachment holes to enable adjustment of a spacing between the side walls of the L-shaped boots to accommodate tires having a width selected from 1 inch to 18 inches and a tire diameter selected from 16 inches to 3 feet. In another embodiment, the mounting brackets have a plurality of attachment holes and the tire block pins have a length sufficient to enable adjustment of a spacing between the side walls of the L-shaped boots to accommodate tires having a width greater than or equal to 1 inch, greater than or equal to 3 inches, greater than or equal to 6 inches, greater than or equal to 12 inches, greater than or equal to 16 inches, greater than or equal to 18 inches, greater than or equal to 20 inches, greater than or equal to 24 inches, or greater than or equal to 36 inches.

In some embodiments, an apparatus for increasing the buoyancy of a wheeled vehicle is modular. For example, the apparatus may contain an adjustable tire block pin, an adjustable mounting bracket or both. In an embodiment, a length of the tire block pin is adjustable to accommodate a distance between the side walls of the L-shaped boots. For example, the length of the tire block pin may be adjustable within a range selected from 1 inch to 36 inches, or selected from 1 inch to 18 inches, or selected from 1 inch to 12 inches, or selected from 1 inch to 6 inches, or selected from 1 inch to 3 inches.

In an embodiment, the ski comprises a contiguous surface that prevents the tire or wheel of the wheeled vehicle from touching the ground beneath the ski. The ski may, in some embodiments, comprise a top sheet laminated to a core fabricated from a material selected from the group consisting of wood, steel, aluminum, titanium, carbon fiber and combinations thereof. Further, the ski may comprise metal edges along a perimeter of the ski and/or a concave runner having a substantially concave cross-sectional profile along a transverse dimension of the ski such that two points of the runner face the ground.

In an embodiment, an apparatus further comprises one or more straps for securing a wheel of the wheeled vehicle to the ski. For example, the one or more straps may be secured to the side walls of the L-shaped boots. Further, the one or more straps may be secured to one or more tie downs disposed on the ski. In an embodiment, a tie down comprises a tightening lever and a lever lock mechanism. In other embodiments, the tie down comprises a cleat, a ring, a U-bolt, a clamp, a ratchet, a Boa® system, or a combination thereof. The tie down may be fabricated from a material selected from the group consisting of wood, aluminum, copper, brass, steel, titanium, metal, metal alloy, plastic, carbon fiber, polymer and combinations thereof.

One or more of the ski, the mounting bracket, the L-shaped boots and the tire block pins may be fabricated from a material selected from the group consisting of wood, aluminum, copper, brass, steel, titanium, metal, metal alloy, plastic, carbon fiber, polymer and combinations thereof.

In an embodiment, the apparatus may be used with a wheeled vehicle having between one and six wheels, and the apparatus may be attached to a front tire, a rear tire, or both a front tire and a rear tire. Exemplary wheeled vehicles for use with the apparatus include but are not limited to those selected from the group consisting of a unicycle, a bicycle, a tricycle, a dirt bike, a car, a truck, an all-terrain vehicle, a motorcycle and a scooter. The bicycle may, for example, be a mountain bike, a road bike, a cross bike, a fat bike, a snow bike, or a cruiser bike.

In an aspect, a method of using an apparatus for increasing the buoyancy of a wheeled vehicle, comprises: providing the apparatus comprising: a ski to be disposed under at least one tire or wheel of a wheeled vehicle; a pair of L-shaped boots, wherein each of the L-shaped boots comprises a bottom wall secured directly or indirectly to the ski and a side wall substantially perpendicular to the bottom wall, wherein the side walls of the L-shaped boots are configured to laterally constrain the tire or wheel of the wheeled vehicle; and at least one tire block pin for connecting the pair of L-shaped boots to one another to increase rigidity of the apparatus and to rotationally constrain the tire or wheel of the wheeled vehicle; mounting the apparatus on the wheeled vehicle; and operating the wheeled vehicle.

In an aspect, a method of using an apparatus for increasing the buoyancy of a wheeled vehicle, comprises: providing an apparatus as disclosed herein; mounting the apparatus on the wheeled vehicle; and operating the wheeled vehicle.

In an embodiment, the wheeled vehicle having the apparatus mounted thereon is operated on snow, water, sand, plastic, metal, a waxed or lubricated surface or combinations thereof.

DETAILED DESCRIPTION

Figure 1:
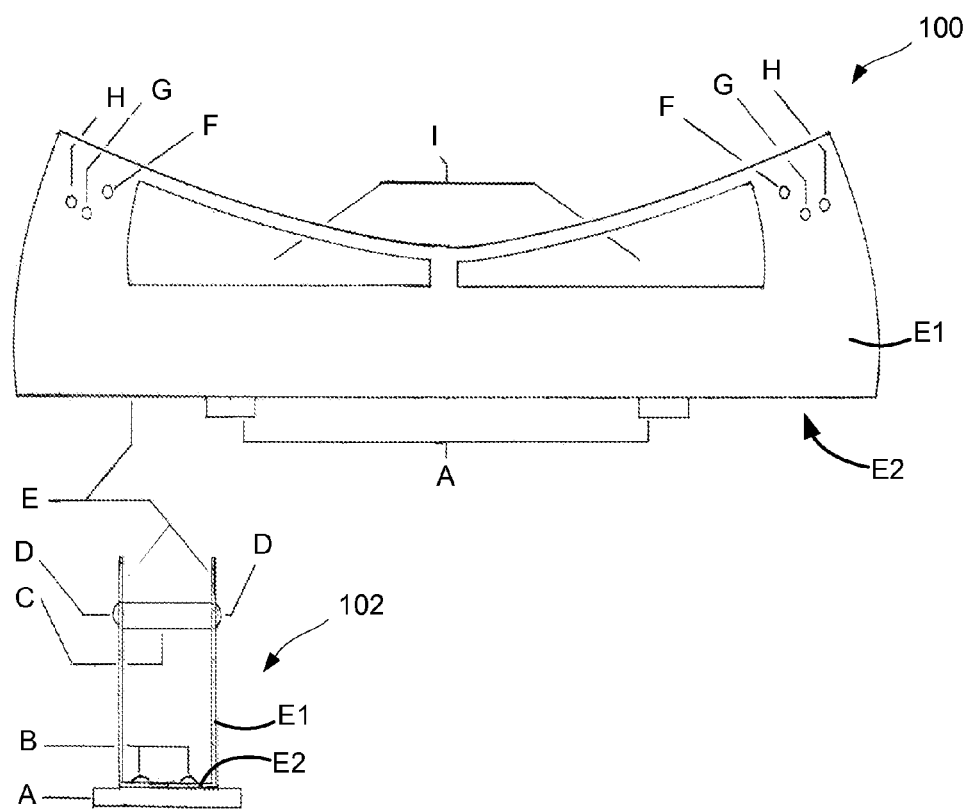
FIG. 1 shows a side view and an end view of a portion of an exemplary apparatus, according to an embodiment of the apparatus.

In general, the terms and phrases used herein have their art-recognized meaning, which can be found by reference to standard texts, journal references and contexts known to those skilled in the art. The following definitions are provided to clarify their specific use in the context of this description.

An "apparatus" is a combination of components operably connected to produce one or more desired functions.

A "component" is used broadly to refer to an individual part of an apparatus.

"Modular" refers to an object constructed of multiple units or components. A modular apparatus, for example, is an apparatus that may be disassembled into a plurality of components.

"Alignment" is used herein to refer to the relative arrangement or position of surfaces or objects. For example, L-shaped boots are in alignment with one another when a gap between the boots is a consistent separation distance along a longitudinal axis of the boots.

"Substantially stationary" refers to an object that rotates less than 5%, or less than 3%, or less than 1% relative to an original starting position. In an embodiment, a wheel that is substantially stationary rotates less than about 5% or less than about 18 degrees.

"Substantially constant" means deviating less than about 5% relative to an ideal endpoint. For example, substantially constant brake pressure is a pressure within about 5% of a pressure that ensures absolutely no movement of the object being acted upon.

"Polymer" refers to a macromolecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers, or polymers consisting essentially of two or more monomer subunits, such as random, block, alternating, segmented, grafted, tapered and other copolymers. Useful polymers include organic polymers or inorganic polymers that may be in amorphous, semi-amorphous, crystalline or partially crystalline states. Crosslinked polymers having linked monomer chains are particularly useful for some applications. Polymers useable in the apparatus and components described herein include, but are not limited to, plastics, elastomers, thermoplastic elastomers, elastoplastics, thermoplastics and acrylates.

"Contiguous" refers to materials or layers that are touching or connected throughout in an unbroken sequence. A contiguous object may be a monolithic object. In an embodiment, a contiguous ski does not have a hole in its interior portion that would allow a tire or wheel to contact the ground beneath the ski.

"Unitary" refers to an object formed as a single piece or undivided whole.

The terms "direct and indirect" describe the actions or physical positions of one component relative to another component, or one apparatus relative to another apparatus. For example, a component that "directly" acts upon or touches another component does so without intervention from an intermediary. Contrarily, a component that "indirectly" acts upon or touches another component does so through an intermediary (e.g., a third component).

Apparatus for increasing the buoyancy of a wheeled vehicle and associated methods will now be described with reference to the figures.

FIG. 1 shows a side view (100) and an end view (102) of a portion of an exemplary apparatus for increasing the buoyancy of a wheeled vehicle, according to an embodiment. The portion of the apparatus shown includes a pair of L-shaped boots (E) that each comprise a bottom wall (E2) secured directly or indirectly to a ski (not shown) and a side wall (E1) substantially perpendicular to bottom wall (E2). The height, length and thickness of the L-shaped boots can be adjusted during manufacture to fit various sized wheels. L-shaped boots (E) may be made of a material selected from the group consisting of aluminum, brass, steel, injection molded plastics, carbon fiber and polymers. The side walls (E1) of the L-shaped boots (E) are configured to laterally constrain a tire or wheel of the wheeled vehicle, and at least one tire block pin (C) connects the pair of L-shaped boots (E) to one another to increase rigidity of the apparatus and to rotationally constrain the tire or wheel of the wheeled vehicle. In an embodiment, the tire block pin (C) may be from about 2 inches to about 5 inches long to accommodate different tire widths, and may be, for example, ½ round stock with a ¼ inch threaded-hole in each end. In some embodiments, the tire block pin (C) may be fabricated from a material selected from the group consisting of aluminum, brass, copper, steel and combinations thereof. A cap screw (D) may, for example, have a stainless steel ¼×½ inch threaded post that mates with the tire block pin (C) and secures the tire block pin (C) to the L-shaped boots (E). Holes (F, G and H) in the side wall (E1) of the L-shaped boot (E) receive and secure the tire block pin (C). The placement of holes (F, G, and H) within the L-shaped boot (E), including the distance between matched holes (F, G, and H) in the front and back ends of an L-shaped boot (E), is selected to accommodate different diameter tires. Larger openings, or incised cut-outs, (I) may be formed in the side wall (E1) of each L-shaped boot (E). The incised cut-outs (I) allow flexibility for the expansion of the tire and contact with the tire as the primary tire attachment mechanism. The incised cut-outs (I) also provide space for self-adhesive material, camming, or other material that functions as a safety leash, loop, strap, or tie as a secondary or back-up attachment mechanism.

Figure 3:
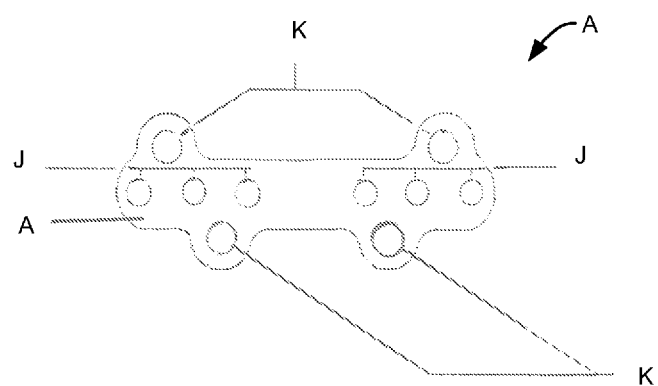
FIGS. 3 and 13 show exemplary top plan views of a mounting bracket, according to an embodiment of the apparatus.
Figure 13:
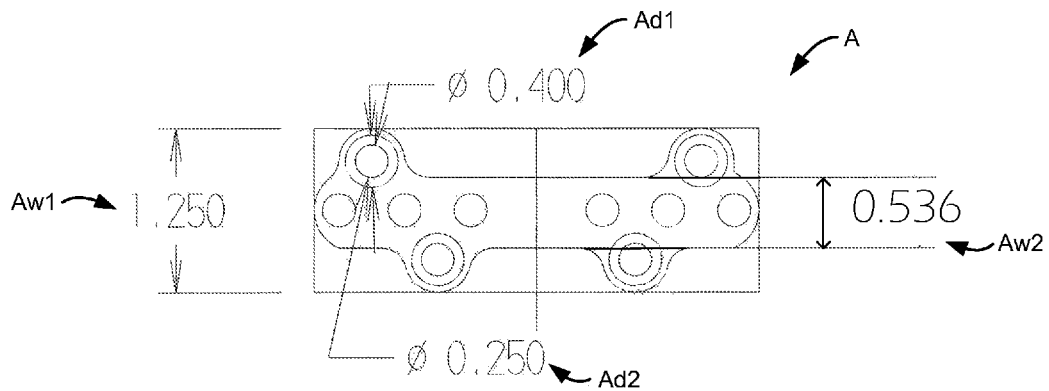

In an embodiment, bottom wall (E2) of the L-shaped boot (E) may be secured indirectly to a ski (not shown) by one or more mounting brackets (A), which are described further with reference to FIGS. 3 and 13. Mounting brackets (A) may, in an embodiment, be 3⅜ inches by 1¼ inches by ⅜ inches and may be fabricated from a material selected from the group consisting of aluminum, brass, copper, steel and combinations thereof. One or more screws (B) may be used to secure mounting bracket (A) to a ski (not shown).

Figure 2:
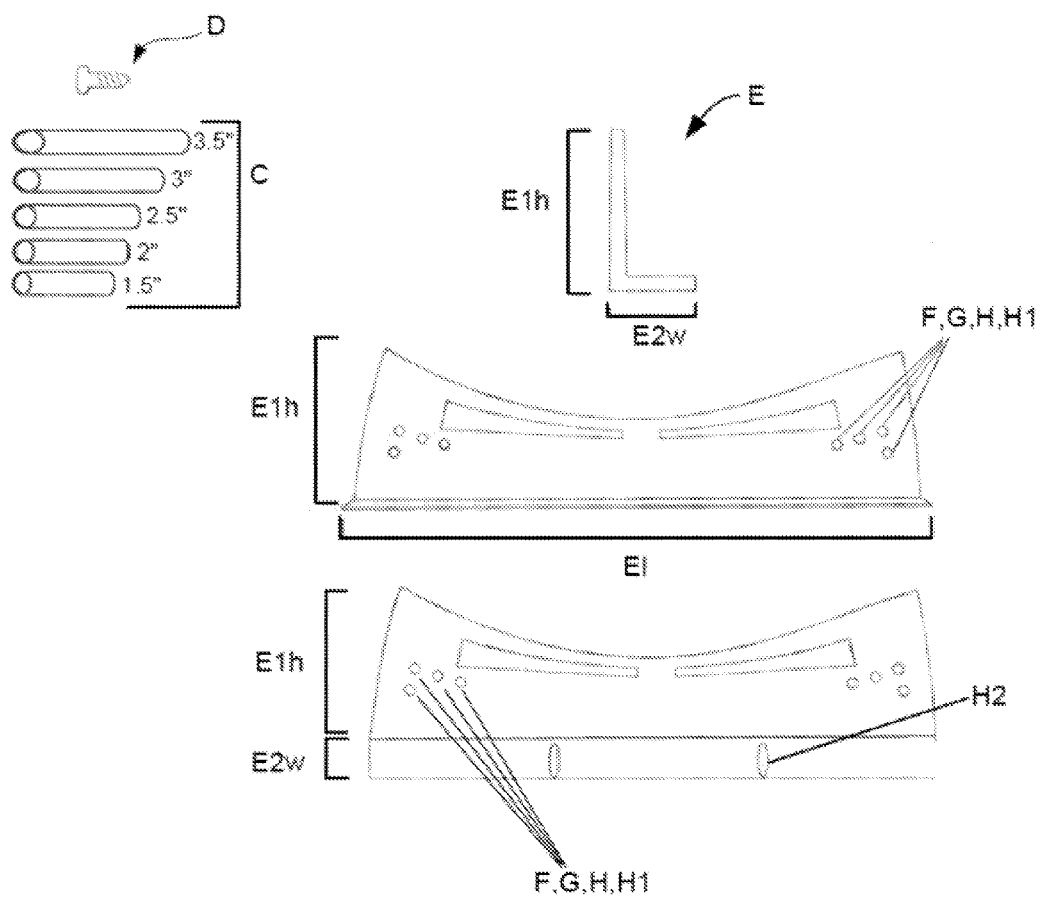
FIG. 2 shows exemplary L-shaped boots and tire block pins, according to multiple embodiments of the apparatus.

FIG. 2 shows exemplary L-shaped boots and tire block pins, according to multiple embodiments of the apparatus. For example, tire block pins (C) may be internally threaded tubes ranging from about 1.5 inches to about 3.5 inches, such that L-shaped boots (E) may be spaced apart to accommodate differing tire widths. Tire block pins (C) are configured to mate with screws (D) at one of holes (F, G, H, H1) for securing to, and properly spacing apart, opposing L-shaped boots (E). In an embodiment, the height of the side wall (E1$h$) of L-shaped boot (E) is about 5 inches, the width of the bottom wall (E2w) of the L-shaped boot (E) is about 1 inch, and the length of the entire boot (E1) is about 19.5 inches. A plurality of holes (F, G, H, H1) in side wall (E1) allows a user to adjust the placement of tire block pin (C) for various sizes of tires. A slotted hole (H2) within bottom wall (E2) of the L-shaped boot (E) allows the boot to be anchored to a mounting bracket, for example, mounting bracket (A) of FIGS. 1, 3, and 13.

FIGS. 3 and 13 show exemplary top plan views of a mounting bracket (A), according to an embodiment of the apparatus. In an embodiment, an outer width (Aw1) of mounting bracket (A) is 1.25 inches and an inner width (Aw2) of mounting bracket (A) is 0.536 inches. Mounting bracket (A) includes holes (J), which may be threaded or unthreaded, and which accept screws (B) (FIG. 1) for attaching one or more L-shaped boots (E) (FIG. 1) to a ski (not shown). Spacing between the L-shaped boots (E) may be adjusted to accommodate various sized tires by appropriate selection of a pair of holes (J). Mounting holes (K) accept stainless steel screws or other securing devices to attach mounting bracket (A) to a ski (not shown). In an embodiment, mounting holes (K) may be beveled to counter sink the head of a screw, and may have an outer diameter of 0.4 inches (Ad1) and an inner diameter of 0.25 inches (Ad2).

Figure 4:
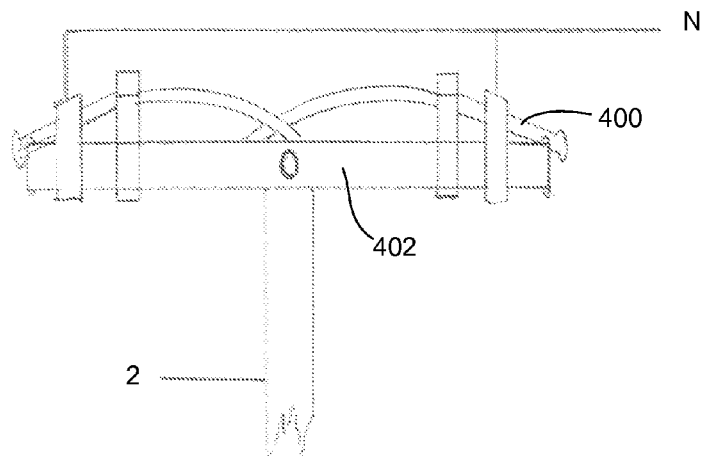
FIG. 4 provides a top view of exemplary devices for applying substantially constant brake pressure to brake levers on a handle bar of a bicycle, according to an embodiment of the apparatus.

FIG. 4 provides a top view of exemplary devices, e.g. brake straps (N) for applying substantially constant brake pressure to brake levers 400 on a handle bar 402 of a bicycle, having a top tube (2), to prevent or control rotation of a wheel mounted to an apparatus, according to an embodiment. In an embodiment, devices (N) are brake straps that surround handle bar 402 and brake levers 400.

Figure 5:
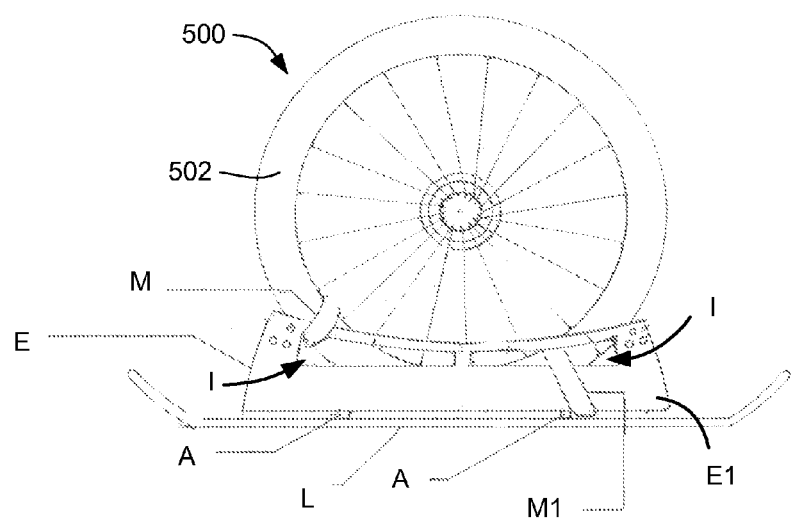
FIG. 5 shows a side plan view of a wheel secured to an apparatus using exemplary straps, according to multiple embodiments of the apparatus.

FIG. 5 shows a side plan view of a wheel 500 secured to an apparatus using exemplary straps (M, M1), according to multiple embodiments of the apparatus. As shown, the apparatus includes a pair of L-shaped boots (E), mounting brackets (A), and a ski (L). The length, width and material of straps (M, M1) may be selected to accommodate wheels of different widths or a range of widths. FIG. 5 shows two placement options for straps (M, M1) securing wheel 500 to an apparatus. In one placement, strap (M) forms a loop through wheel 500, outside side walls (E1) of opposing L-shaped boots (E), through incised cut-outs (I), and under a tire 502 attached to wheel 500. In another placement, strap (M1) forms a loop between L-shaped boots (E) and ski (L), outside side walls (E1) of L-shaped boots (E), through incised cut-outs (I), and over wheel 500. In another placement (see FIG. 6), a strap may form a loop between L-shaped boots (E) and ski (L) (and, for example, between mounting brackets (A)), outside side walls (E1) of L-shaped boots (E), and over wheel 500, without passing through incised cut-outs (I).

Figure 6:
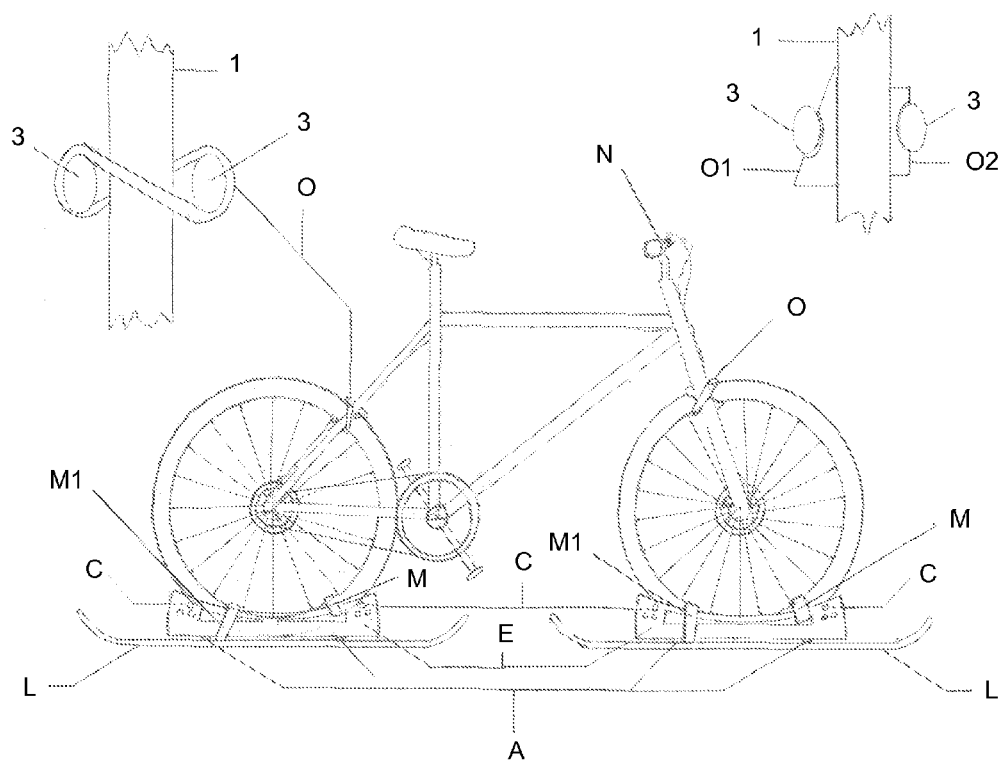
FIG. 6 shows a side plan view of a bicycle having an apparatus secured to each of a front wheel and a rear wheel, where the wheels are prevented from rotating by one or more brake blocks for locking a wheel of the wheeled vehicle against a frame component of the wheeled vehicle, according to multiple embodiments of the apparatus.

FIG. 6 shows a side plan view of a bicycle 600 having an apparatus secured to each of a front wheel and a rear wheel. Each apparatus comprises a pair of L-shaped boots (E) attached to a ski (L) by mounting brackets (A), a pair of tire block pins (C), and a pair of brake straps (N). In addition to a snug friction fit between the walls of the tires and the interior walls of L-shaped boots (E), the wheels are prevented from rotating by one or more brake blocks (O, O1, O2) for locking a wheel (1) of the bicycle against a frame component (3). In an embodiment, a brake block (O) is a band or strap (e.g., a figure eight strap) that ties or secures the wheel (1) to a frame component (3) of the bicycle frame, such as a rear seat stay or front fork leg. The band or strap may for example be made of Velcro, nylon webbing, rubber or combinations thereof. In an embodiment, a brake block (O1) is a wedge positioned between a tire and a fixed frame component (3) of the bicycle frame, such as a rear seat stay or front fork leg. In an embodiment, a brake block (O2) is a substantially rectangular object having a relief feature shaped to receive and tightly mate with a fixed frame component (3) of the bicycle. In use, the brake block (O2) is positioned between a tire of wheel (1) and frame component (3) to prevent or constrain rotation of wheel (1). A brake block configured as a wedge or substantially rectangular object may, for example, be made of rubber, plastic, wood or combinations thereof.

Figure 7:
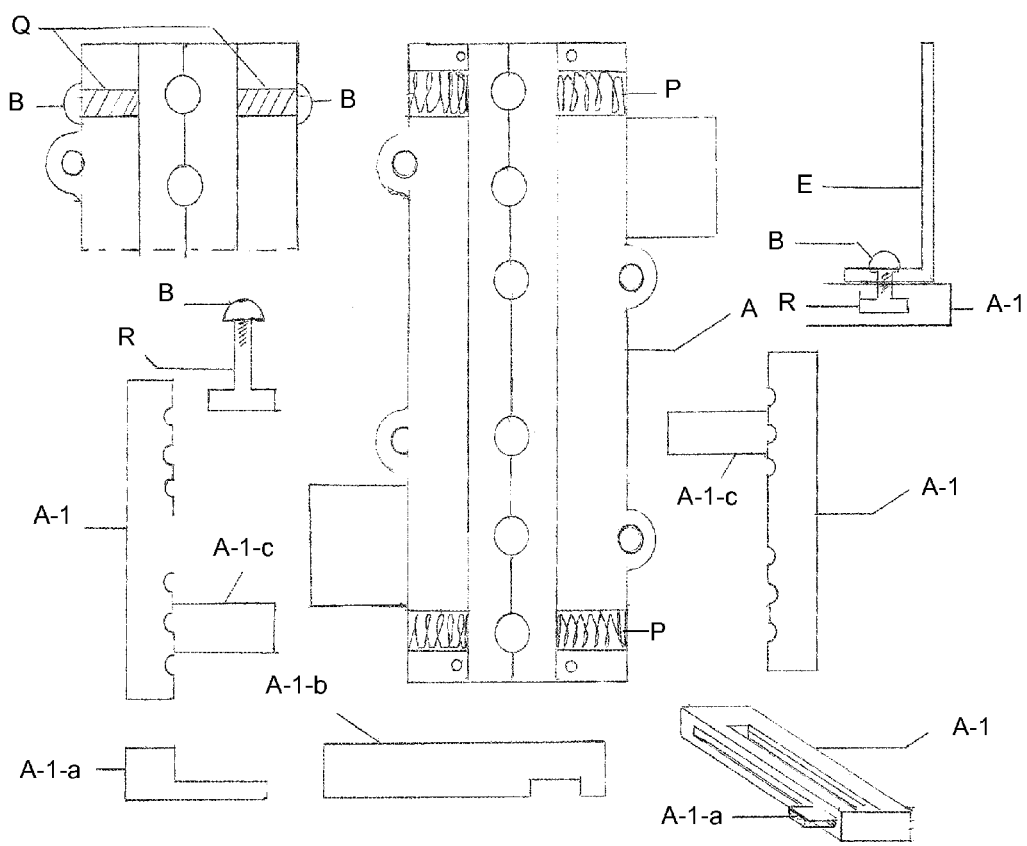
FIG. 7 shows an exemplary adjustable mounting bracket, according to an embodiment of the apparatus.

FIG. 7 shows an exemplary adjustable mounting bracket (A), according to an embodiment. The adjustable mounting bracket (A) comprises right and left pin locks (A-1) that lock adjustable boot locking pins (R) into mounting bracket (A). The right and left pin locks (A-1) are opened or closed by action of springs (P) or screws (Q). When springs (P) or screws (Q) force the pin locks (A-1) together, adjustable boot locking pin (R) is secured within a hole (J) (see FIG. 3). A cap screw (B) may, for example, attach to adjustable boot locking pin (R) to connect an L-shaped boot (E) directly to the adjustable mounting bracket (A-1) and indirectly to a ski (not shown) when screws are inserted through mounting holes (K). An end view (A-1-a) and back view (A-1-b) of pin lock (A-1) are shown in FIG. 7, and back view (A-1-b) shows a slot for right or left slide (A-1-c). Pin locks (A-1) may be forced open by applying pressure to the ends of slides (A-1-c). When the opening force is removed, pin locks (A-1) are automatically closed by the action of springs (P) or manually closed by the action of screws (Q).

In an alternate embodiment, width adjustment between the L-shaped boots may be achieved by a hard plastic buckle, a ratchet type adjustment, or a push button pin mechanism attached to the apparatus beneath the boot. For example, instead of applying force to pin locks (A-1) using springs (P) or screws (Q), each pin lock (A-1) may have a grooved tongue that mates with a ratchet buckle on a matched pin lock (A-1), or each pin lock (A-1) may have a tongue with a distal end comprising a wire gate that mates with toothed buckle on a matched pin lock (A-1). These alternate mechanisms for width adjustment between the L-shaped boots are applied to the apparatus in place of the basic mounting bracket. These mechanisms may, for example, be fabricated from materials selected from the group consisting of steel, aluminum, other metals, plastics, and composites.

Figure 8:
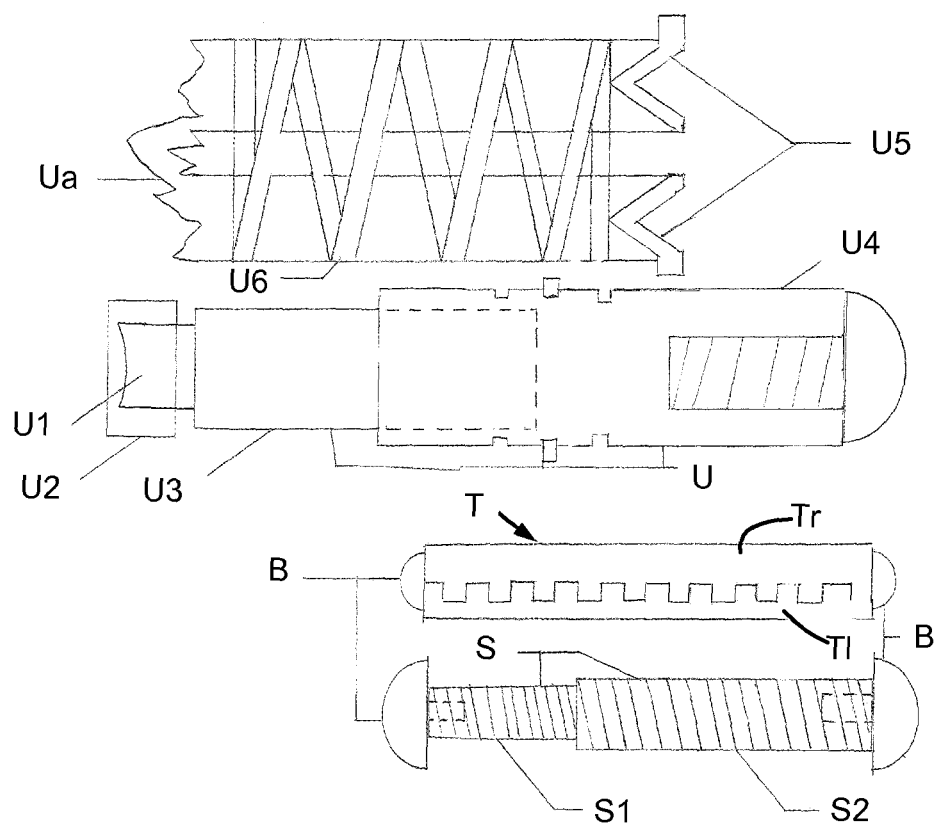
FIG. 8 shows exemplary adjustable tire block pins, according to multiple embodiments of the apparatus.

FIG. 8 shows exemplary adjustable tire block pins. In an embodiment, an adjustable tire block pin (S) is threaded. A male portion (S1) of the pin (S) is threaded on an exterior and a female portion (S2) of the pin (S) is internally threaded. The male and female portions may be threaded together to expand or contract the length of pin (S) to accommodate tires of various sizes. Tire block pin (S) is positioned between the side walls of two L-shaped boots (E) and screws (B) are attached to the pin (S) from the exterior of side walls (E1) of the L-shaped boots (E). In another embodiment, an adjustable tire block pin (T) is toothed, and right and left toothed pins (Tr, Tl) can be adjusted by laterally sliding the right and left toothed pins (Tr, Tl) in opposite directions to unlock the pins and shifting the teeth to accommodate tires of various sizes. Tire block pin (T) is positioned between side walls (E1) of two L-shaped boots (E) and screws (B) are attached to pin (T) from the exterior of side walls (E1) of L-shaped boots (E). In yet another embodiment, an adjustable tire block pin (U) is spring loaded and may be push-button activateable, as shown in cut-away cross section (Ua) which illustrates the inner mechanism of adjustable tire block pin (U). Adjustable tire block pin (U) comprises a tension spring (U6) within an inner (male) spring lock holder (U3) and an outer (female) spring lock holder (U4). At least one end of tension spring (U6) comprises one or more locking protrusions that abut indents within outer spring lock holder (U4) to lock inner (U3) and outer (U4) spring lock holders together. A push-button pin rod (U1) compresses tension spring (U6). Tire block pin (U) is positioned between the side walls of two L-shaped boots (E) and one screw (B) and one threaded lock cap (U2) are attached to pin (U) from the exterior of the side walls of the L-shaped boots (E).

Figure 9:
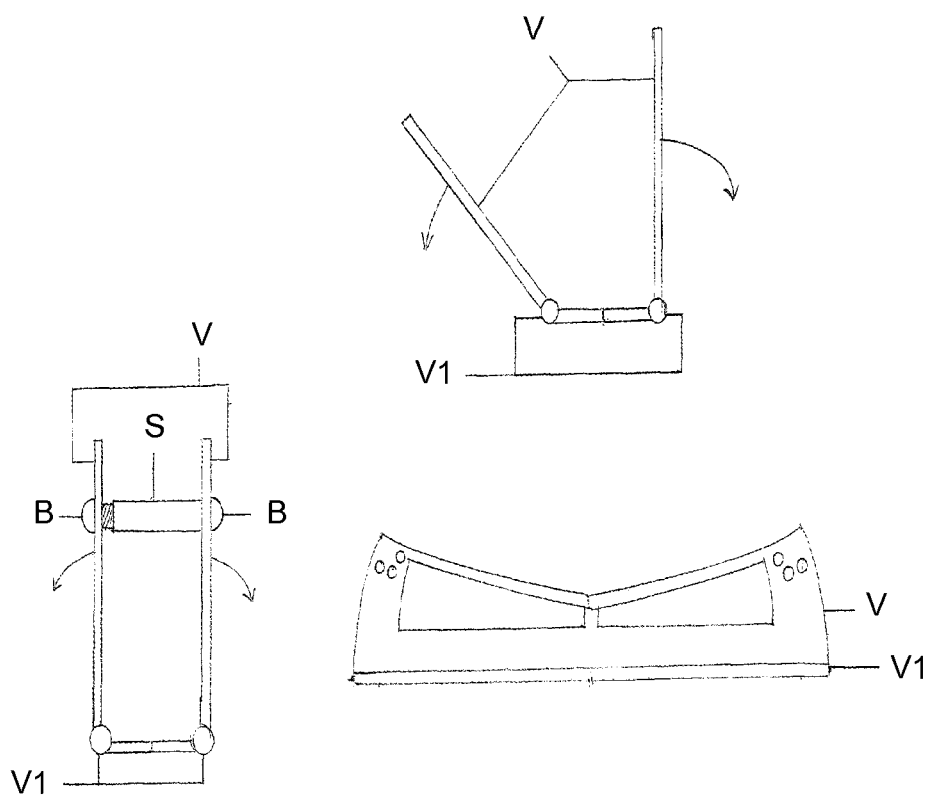
FIG. 9 shows exemplary hinged L-shaped boots, according to an embodiment of the apparatus.

FIG. 9 shows exemplary hinged L-shaped boots (V), according to an embodiment of the apparatus. Each L-shaped boot (V) comprises a hinge (V1) that allows the side wall and bottom wall of the L-shaped boots to pivot relative to one another, e.g., in the direction of the arrows shown, to lay flat for storage or transport. In a separate embodiment, one L-shaped boot (V) comprises a hinge (V1), with the other L-shaped boot being substantially ridged, similar to L-shaped boot (E) of FIG. 1.

Figure 10:
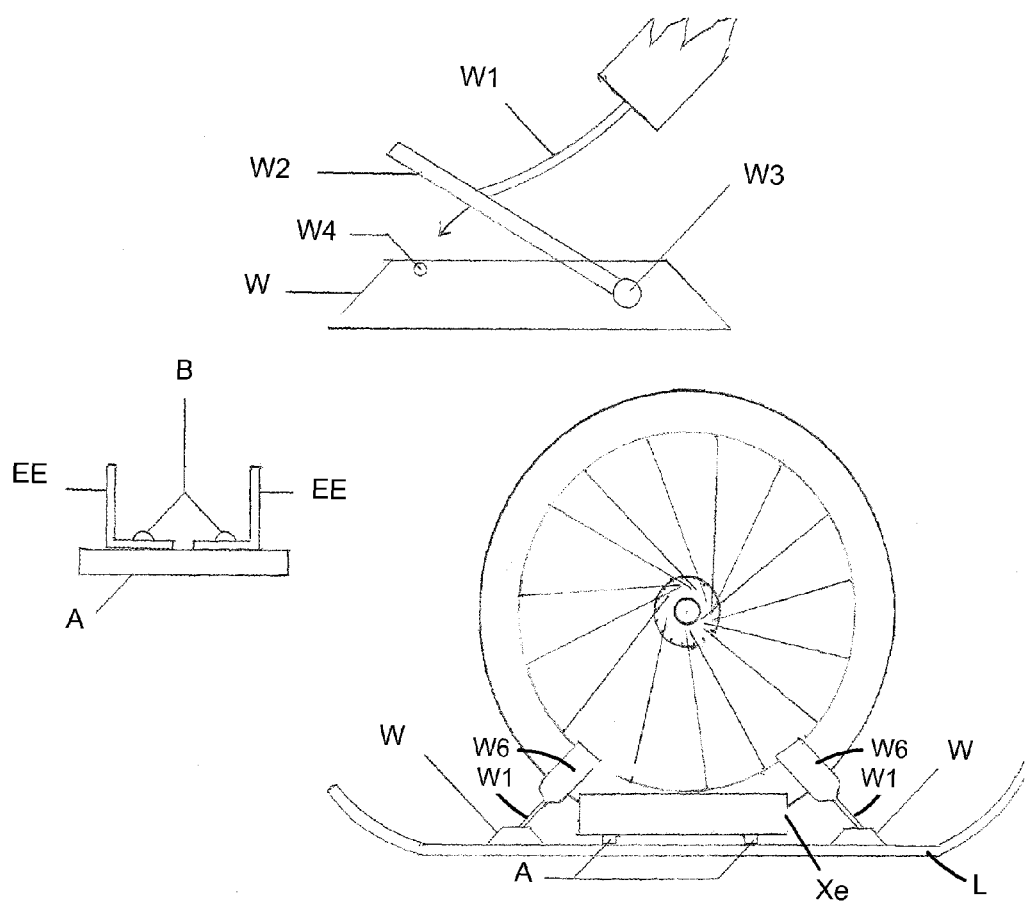
FIG. 10 shows exemplary tie downs for securing a wheel, according to an embodiment of the apparatus.

FIG. 10 shows exemplary tie downs for securing a wheel, according to an embodiment of the apparatus. The apparatus, as shown, comprises a pair of L-shaped boots (EE), which may be fixed or hinged, attached to at least one mounting bracket (A) via a pin (not shown) and screw (B), and further attached to a ski (L) via mounting screws (not shown). In this embodiment, tire block pins (C) are optional, and rotational movement of the wheel is constrained when tire straps (W6, see FIG. 10) and ties (W1) connecting tire straps (W6) and tie down (W) are affixed to a pair of tie downs (W) positioned fore and aft of boots (EE) and mounted to the ski (L). Tie downs (W) can be fabricated from a material selected from the group consisting of aluminum, brass, plastic, carbon fiber, polymers and combinations thereof. In an embodiment, tie downs (W) may contain a tightening lever (W2) that is rotatable about a tightening-lever pin (W3) and lockable via a tightening-lever lock pin (W4). In other embodiments tie downs (W) may be cleats, camming devices, rings, U-bolts, Boa® mechanisms, locking winches, and the like.

Figure 11:
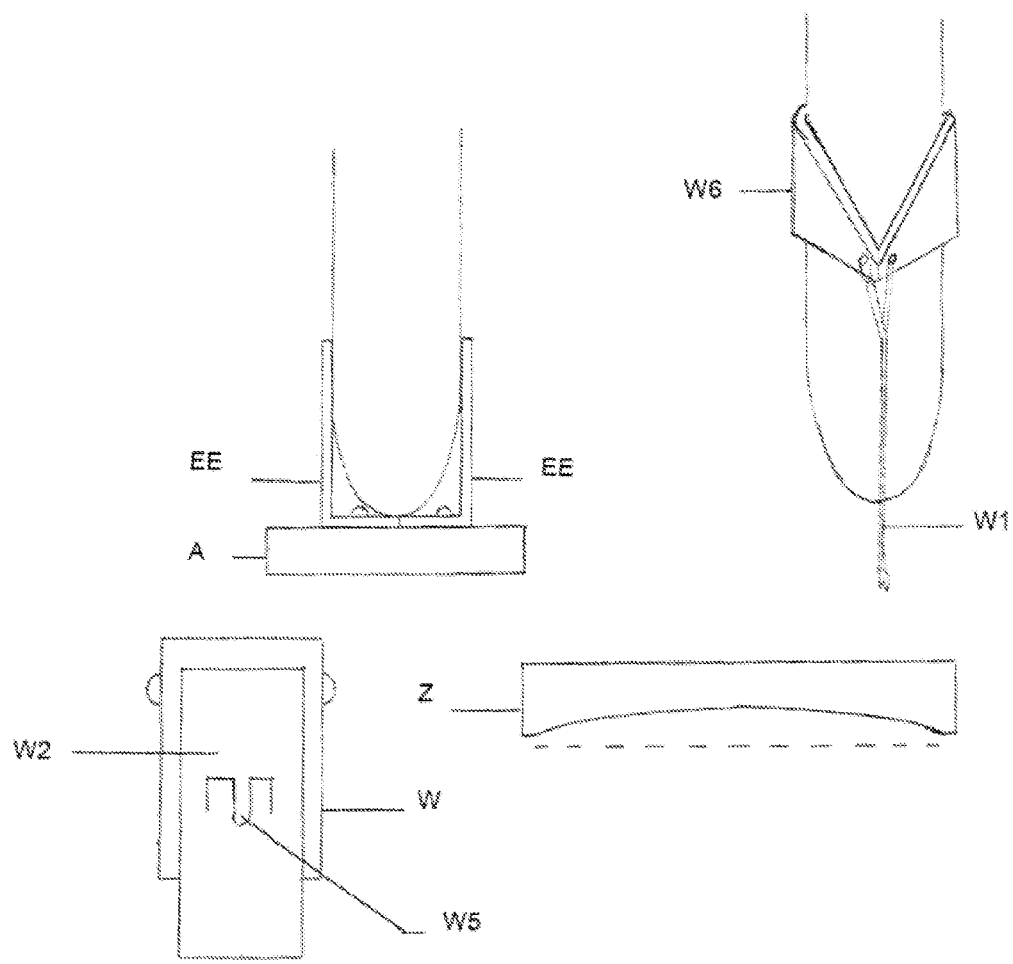
FIG. 11 shows additional features of the tie downs depicted in FIG. 10.

FIG. 11 shows additional features of the tie downs depicted in FIG. 10. For example, ties (W1) may attach to a tightening-lever hook (W5) forming part of tightening lever (W2).

The apparatus described herein may be used with various types of skis (L), including but not limited to flat skis, skis having a water channel, skis having a concave runner, as shown by the cross-section (Z) of FIG. 11, skis having duel tips, skis having one or more rockered tips, skis having metal edges, skis lacking metal edges, and the like.

Figure 12:
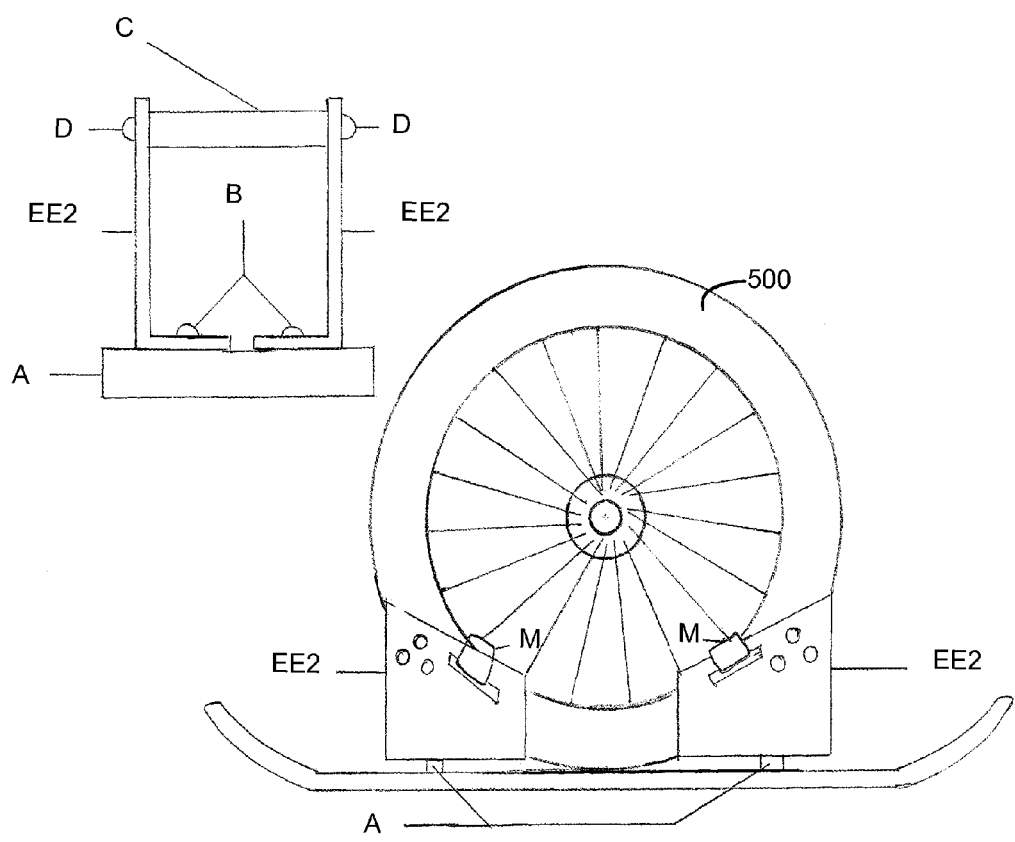
FIG. 12 shows an exemplary apparatus having a split configuration, according to an embodiment.

FIG. 12 shows an exemplary apparatus having a split configuration, according to an embodiment. In the embodiment shown, material from the center of each L-shaped boot (E) has been removed to form right front and rear halves (EE2) and left front and rear halves (not shown), leaving the center of wheel 500 open. An advantage of this embodiment is that is reduces weight, and potentially material costs. Straps (M) secure wheel 500 through incised cut-outs (I) in each half boot (EE2).

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a wheel" includes a plurality of such wheels and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed can be resorted to by those skilled in the art, and that such modifications and variations are considered to be within the scope of this invention as defined by the appended claims.

We claim:

1. An apparatus for increasing the buoyancy of a wheeled vehicle, comprising:
    a ski to be disposed under at least one tire or wheel of the wheeled vehicle;
    a pair of L-shaped boots, wherein each of the L-shaped boots comprises a bottom wall secured to the ski and a side wall substantially perpendicular to the bottom wall, wherein the side walls of the L-shaped boots are configured to laterally constrain the tire or wheel of the wheeled vehicle;
    at least one mounting bracket positioned between the ski and the bottom walls of the L-shaped boots, wherein the mounting bracket comprises holes configured to independently align with the ski and the boot; and
    at least one tire block pin for connecting the pair of L-shaped boots to one another to increase rigidity of the apparatus and to rotationally constrain the tire or wheel of the wheeled vehicle.

2. The apparatus of claim 1, wherein the apparatus is modular.

3. The apparatus of claim 1, wherein the ski comprises a contiguous surface that prevents the tire or wheel of the wheeled vehicle from touching the ground beneath the ski.

4. The apparatus of claim 1, wherein a tire or wheel having the apparatus mounted thereon does not rotate to drive the wheeled vehicle.

5. The apparatus of claim 1, wherein a tire or wheel having the apparatus mounted thereon is prevented from rotating by a device applying brake pressure.

6. The apparatus of claim 1, wherein the tire and the side wall of the L-shaped boot are in direct contact.

7. The apparatus of claim 1, wherein a distance between the side walls of the L-shaped boots is adjustable.

8. The apparatus of claim 1, wherein a length of the tire block pin is adjustable to accommodate a distance between the side walls of the L-shaped boots.

9. The apparatus of claim 1, wherein the side wall of the L-shaped boot is hinged to the bottom wall of the L-shaped boot.

10. The apparatus of claim 1 further comprising one or more straps for securing a wheel of the wheeled vehicle to the ski.

11. The apparatus of claim 10, wherein the one or more straps are secured to one or more tie downs positioned fore and/or aft of the L-shaped boots and disposed on the ski.

12. The apparatus of claim 10, wherein the one or more straps are secured to the side walls of the L-shaped boots.

13. The apparatus of claim 1 further comprising a brake block for locking a wheel of the wheeled vehicle against a frame component of the wheeled vehicle.

14. The apparatus of claim 1 further comprising a brake lever band for continually activating a brake lever of the wheeled vehicle.

15. The apparatus of claim 1, wherein the apparatus is attached to a front tire or wheel, a rear tire or wheel or both a front tire or wheel and a rear tire or wheel.

16. A method of using an apparatus for increasing the buoyancy of a wheeled vehicle, comprising:
    providing the apparatus of claim 1;
    mounting the apparatus on the wheeled vehicle; and
    operating the wheeled vehicle.

17. The method of claim 16, wherein the wheeled vehicle having the apparatus mounted thereon is operated on snow, water, sand, plastic, metal, a waxed or lubricated surface or combinations thereof.

18. An apparatus for increasing the buoyancy of a wheeled vehicle, comprising:
    a ski to be disposed under at least one tire or wheel of a wheeled vehicle;
    a pair of L-shaped boots, wherein each of the L-shaped boots comprises a bottom wall secured directly or indirectly to the ski and a side wall substantially perpendicular to the bottom wall, wherein the side walls of the L-shaped boots are configured to laterally constrain the tire or wheel of the wheeled vehicle; and
    a pair of tie downs positioned fore and aft of the L-shaped boots and disposed on the ski for securing the wheel and rotationally constraining the tire or wheel of the wheeled vehicle.

19. An apparatus for increasing the buoyancy of a wheeled vehicle comprising:
    a ski to be disposed under at least one tire or wheel of a wheeled vehicle;
    a boot having a unitary structure including a bottom wall secured to the ski and two side walls substantially perpendicular to the bottom wall, wherein the side walls are configured to laterally constrain the tire or wheel of the wheeled vehicle;
    at least one mounting bracket positioned between the ski and the bottom wall of the boot, wherein the mounting bracket comprises holes configured to independently align with the ski and the boot; and
    at least one tire block pin for connecting the side walls to one another to increase rigidity of the apparatus and to rotationally constrain the tire or wheel of the wheeled vehicle.

* * * * *